Figure 1:
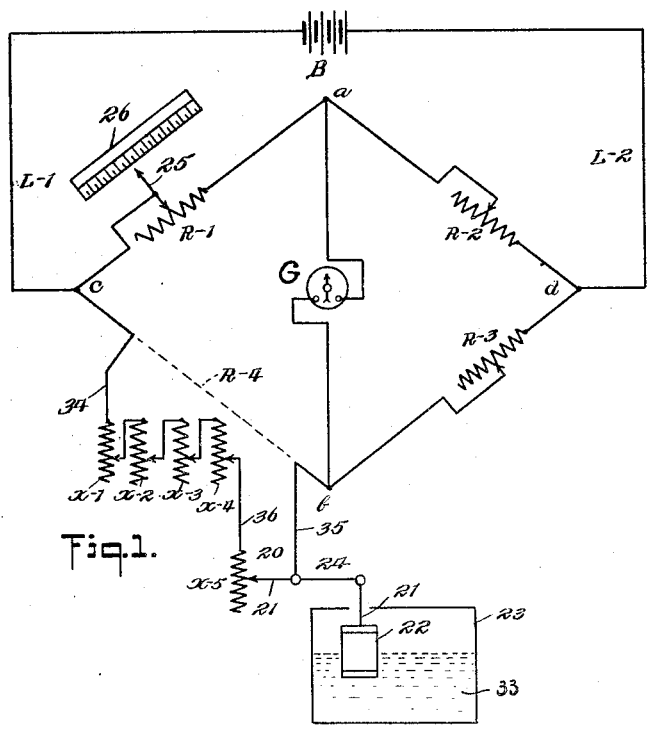

H. J. MURRAY.
AUTOMATIC ELECTRIC WEIGHT MEASURING DEVICE FOR MOVABLE CARRIERS.
APPLICATION FILED OCT. 11, 1918.

1,407,078.

Patented Feb. 21, 1922.

INVENTOR
Howard J. Murray
BY
Messimer and Austin
ATTORNEY

UNITED STATES PATENT OFFICE.

HOWARD J. MURRAY, OF BROOKLYN, NEW YORK.

AUTOMATIC ELECTRIC WEIGHT-MEASURING DEVICE FOR MOVABLE CARRIERS.

1,407,078.  Specification of Letters Patent.  Patented Feb. 21, 1922.

Application filed October 11, 1918. Serial No. 257,806.

*To all whom it may concern:*

Be it known that I, HOWARD J. MURRAY, a citizen of the United States, and resident of Brooklyn, in the county of New York and State of New York, have invented certain new and useful Improvements in Automatic Electric Weight-Measuring Devices for Movable Carriers, of which the following is a specification.

My invention relates in general to means for weighing and specifically relates to electrical means for weighing mass when placed on movable carriers.

One of the objects of my invention is to provide a simple form of electric weighing device, which when placed between the spring supported and rigid members of a carrier, will cause an electric meter to indicate, record, add or substract the weight of mass on said spring supported body independent of any variation in voltage in the source of electric current actuating the meter.

In one embodiment of my invention, I broadly attain the indication of the weight of this carried mass by causing the weight to effect the resistance in one of the four legs of a so-called Wheatstone bridge having the other three legs of equal resistance. Thus by varying the resistance of this said fourth leg I thereby vary the electric current in the so-called "galvanometer circuit" of the said "Wheatstone bridge" and accordingly affect an electric meter placed in this said galvanometer circuit, said meter measuring and calibrated in units of weight.

Among the other objects of the invention is to provide a device of the class described in which the system can be brought to zero under any given load condition, in which the meter is sensitive to variations in load from any present load and in which variations in loads not desired to effect the reading of the meter are ineffective.

The invention is susceptible of numerous physical embodiments, only one of which is set forth, but it is understood that the showings in the drawing are largely diagrammatic, merely being sufficient in detail to show an application of the invention.

While the invention is obviously capable of use with any form of movable carrier designed to support the load receiving member on springs, the invention is particularly applicable to automobile trucks and it is in connection with this particular use that the invention will be described in detail.

Various other objects and advantages of the invention will be in part obvious from an inspection of the accompanying drawings and in part will be more fully set forth in the following particular description of one form of mechanism embodying my invention, and the invention also contemplates novel features of construction and combination of parts hereinafter set forth and claimed.

Figure 2:
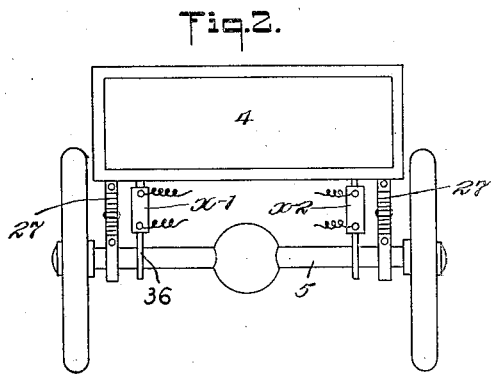
Figure 3:
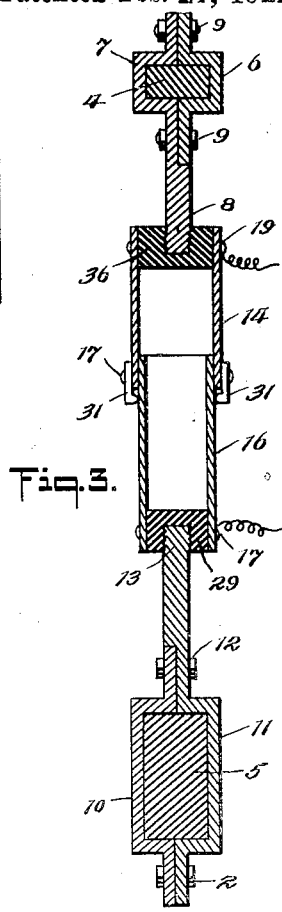

In the drawings:

Figure 1 is a diagrammatic view, showing one method of connecting the resistances, meter and source of current in one physical embodiment of my invention, and Figure 2 is a view in elevation of a physical embodiment of my invention, showing the various parts attached to an auto truck; and Figure 3 is a transverse sectional view of the resistance unit showing one method of mounting the resistance tube and its wipers or fingers.

In the following description and in the claims, parts will be identified by specific names for convenience of expression, but they are intended to be as generic in their application to similar parts as the art will permit.

Referring to the embodiment of the invention disclosed in Figure No. 1, there are indicated variable resistances $R^1$, $R^2$, and $R^3$ comprising three legs of a so-called Wheatstone bridge, variable resistances $X^1$, $X^2$, $X^3$, $X^4$ and $X^5$ comprising the fourth leg, a galvanometer G and its circuit connected at the points "$a$" and "$b$," a source of current "B", having leads $L^1$ and $L^2$, a float #22 having a pivoted arm #21 pivoted at #24 and ending in a wiper #20. There is also shown a scale #26 and a movable indicator #25 therewith connected to the wiper for variable resistance $R^1$.

In Figure No. 2 there is shown the invention in a physical application to an auto truck having body supporting springs #27 and a spring supported body #4. Between the axle #5 and the said spring supported body #4 there are mounted two of the four variable resistance units $X^1$ and $X^2$. It is understood that the other two resistances $x^3$ and $x^4$ are similarly mounted between the body 4 and the other vehicle axle. The resistances $x^1$ to $x^4$ may be of any conventional form of rheostat in which the movable control element is actuated by relative movement between the axle and the vehicle body. For this purpose the rheostats are mounted in a casing 14 carried by the body 4 and their movable control arms 36 are connected to the axles.

In Figure 3 there is shown a transverse section of one of the variable resistance units $X^1$ to $X^4$. A clamp comprised of parts #10 and #11 and ending in a threaded portion #13 secures the unit to the truck wheel axle #5. This threaded portion #13 screws into an insulator #29 to which the high resistance tube #16 is firmly attached by means of screws #17. Wiping contact fingers #31 are secured to a brass or copper tube #14 by means of screws #17. The tube #14 is connected to the spring supported body #4 by means of clamps #6 and #7, which screw into insulating material #30, to which the said tube #14 is attached by means of screws #19.

In operation and with the wiper 25 set in one case to balance the resistance $R^2$, it may be assumed that the spring supported load is zero. As load is added to the body 4, one or more of the control members of the rheostats $X^1$ to $X^4$ will be actuated to thus decrease the resistance in the leg $R^4$. This will of course affect the "galvanometer circuit" and cause the meter G to function.

If the meter at "G" is an indicating meter the variation will be indicated in units of weight, if the meter records a continuous record of the weight will be given.

It should now be noted that while the weight of the transient load is changing the total weight of propelling fuel is also changing, or the weight of the transient load may remain constant and the weight of the said fuel decrease as it is consumed. Hence to obtain the proper indication, record or integration of the actual load, correction must be made for the varying fuel or other changing or incidental load. This is done by the variation of resistance $X^5$ also in the leg $R^4$ and in series electrically with $X^1$, $X^2$, $X^3$ and $X^4$.

This correction is entirely automatic and accurate as the variation of $X^5$ affects the flow of current from "$b$" to "$a$" exactly as the resistances in the leg $R^4$.

The weight of the transient load may also be read off a scale exactly the same as is done off of the common weighing scales.

It is evident that if the variation of the load affects $R^4$ then $R^1$ will have to be varied the same amount in order to again balance the bridge and bring the current flowing from "$b$" to "$a$" to a zero value. Now, if the meter at "G" is a galvanometer of the slow moving type and normally indicates O then the wiper #25 of the variable resistance in the leg $R^1$ may be moved along the scale #26 until the meter "G" indicates O or the fact that no current is flowing in the circuit ("$b$"—"$a$").

If this scale #26 is calibrated in units of weight then the weight on the spring supported member #4 will be given at the point indicated by #25 when the Wheatstone bridge is balanced. It is understood, of course, that the weight may be indicated only by this method.

Any degree of sensitiveness may be obtained by varying the ratio of $\frac{R-1}{R-2} = \frac{R-4}{R-3}$ for condition of balance or zero current in "$b$"—"$a$."

It is also evident that the variation of the voltage of the source "B" will not have any effect on the meter "G" as the division of current remains a constant for any given condition of the resistance in the four legs. This condition will allow use of current from the storage battery as commonly found on motor trucks, and it also allows the battery to be charged by the generator without any effect on the electric meters.

Further, the resistance $X^5$ may be used to correct for any varying weight on the carrier outside of the so-called regular load, such for example, as cooling water, coal, oil, etc.

If one or more of the $X^5$ resistances are employed they may be positioned so as to correct for the weight of the driver, additional weight of top to body, or perhaps mud, etc.

Having thus described my invention I claim:—

1. In a device of the class described, the combination with a relatively stationary member and a relatively movable member, of an electric circuit including a Wheatstone bridge having an electric meter in the galvanometer circuit thereof, means for varying the resistance in one leg of said Wheatstone bridge, said means including a two part mechanical means for affecting electrical resistance with one of the parts mounted on the stationary member and the other part mounted on the relatively movable member whereby a relative movement between said stationary and said movable member will affect the resistance in said leg and thus affect the reading of the electric meter and means associated with said resistance varying means compensating for movement affecting factors acting on said movable member.

2. In a device of the class described, the combination with a spring supported vehicle adapted to be lowered against the action of the springs by loads imposed thereon, of a plurality of electro-mechanical resistance changing devices having operative connection with the body of the vehicle for operation upon depression of the body incidental to both transient and incidental weights placed on the body, electrically actuated mechanism operatively connected to said devices to be actuated by a movement of the body into an operative position by said weights and means including one of said devices actuated by variations in said incidental weight and operatively connected to said mechanism to compensate for the effect on said mechanisms produced by variation in said incidental weight.

3. In a device of the class described, the combination with a spring supported vehicle having an axle, of a plurality of electro-mechanical resistance changing devices having operative connection with the body and with the axle of the vehicle for operation upon depression of the body incidental to weight placed thereon, electrically actuated mechanisms operatively connected to said devices to be actuated by a movement of the body into an operative position, and constantly acting means operatively connected to said mechanism to compensate for the effect produced thereon by the depression of the body caused by a part of the weight.

4. In a device of the class described, the combination of a yieldably supported body provided with a tank for containing liquid, a float in said tank, an electric circuit including a Wheatstone bridge, a plurality of electro-mechanical resistance changing devices operatively connected to one leg of said Wheatstone bridge to affect the electrical condition of the same, certain of said devices being operatively connected to said body for operation upon depression of the latter incident to weight placed on the body and another of said devices being operatively connected to said float whereby the electrical condition of said circuit is affected by the change in level of the liquid in the tank and indicating mechanism operable by an electrical condition of said circuit.

5. In a device of the class described, the combination of a yieldably supported body, provided with an element for receiving an incidental weight, electrically actuated mechanisms operatively actuated by the depression of said body by the weight thereon for indicating a function of said weight, manually actuated means for controlling said mechanisms and means actuated by said weight receiving element and operatively connected with said mechanism to compensate for the weight imposed on the body through said element.

Signed at New York, in the county of New York and State of New York, this 5th day of October, A. D. 1918.

HOWARD J. MURRAY.